(12) United States Patent
Okita et al.

(10) Patent No.: US 10,571,886 B2
(45) Date of Patent: Feb. 25, 2020

(54) MACHINE TOOL CONTROL DEVICE HAVING FUNCTION OF DIAGNOSING MALFUNCTION IN SENSOR FOR DETECTING ONE-ROTATION SIGNAL

(71) Applicant: FANUC CORPORATION, Yamanashi (JP)

(72) Inventors: Tadashi Okita, Yamanashi (JP); Yuuki Morita, Yamanashi (JP); Geng Li, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 375 days.

(21) Appl. No.: 15/496,197

(22) Filed: Apr. 25, 2017

(65) Prior Publication Data
US 2017/0315533 A1 Nov. 2, 2017

(30) Foreign Application Priority Data
Apr. 28, 2016 (JP) ................................. 2016-091909

(51) Int. Cl.
*H02K 29/00* (2006.01)
*G05B 19/18* (2006.01)
*G05B 19/4062* (2006.01)

(52) U.S. Cl.
CPC ....... *G05B 19/182* (2013.01); *G05B 19/4062* (2013.01); *G05B 2219/33329* (2013.01); *G05B 2219/42329* (2013.01); *G05B 2219/49103* (2013.01)

(58) Field of Classification Search
CPC .............. G05B 19/182; G05B 19/4062; G05B 2219/33329; G05B 2219/42329; G05B 2219/49103
See application file for complete search history.

(56) References Cited

U.S. PATENT DOCUMENTS

| 8,471,506 B2 | 6/2013 | Manabe |
| 2010/0283417 A1 | 11/2010 | Holzmann et al. |
| 2013/0013250 A1* | 1/2013 | Shibata .............. G01D 5/24466 702/150 |

FOREIGN PATENT DOCUMENTS

| CN | 102055388 A | 5/2011 |
| CN | 102681477 A | 9/2012 |
| CN | 103185603 A | 7/2013 |

(Continued)

*Primary Examiner* — Muhammad S Islam
(74) *Attorney, Agent, or Firm* — RatnerPrestia

(57) ABSTRACT

A machine tool control device according to the present invention includes a feedback counter for obtaining A- and B-phase signals of rectangular waves or sine waves and a one-rotation signal, which are outputted from a sensor for detecting the position or speed of a driven axis or a motor, to calculate a feedback count value that is a count value of the number of feedback pulses generated from the A- and B-phase signals; a feedback count value storage unit for storing an inter-one-rotation-signal feedback count value that is the feedback count value counted between the two sequential one-rotation signals; a reference value storage unit for storing an anomaly determination reference value corresponding to the inter-one-rotation-signal feedback count value; and an anomaly cause determination unit for determining the cause of an anomaly by comparison between the inter-one-rotation-signal feedback count value and the anomaly determination reference value.

3 Claims, 4 Drawing Sheets

(56) References Cited

FOREIGN PATENT DOCUMENTS

| | | | |
|---|---|---|---|
| JP | 61065309 | A | 4/1986 |
| JP | 63243703 | A | 10/1988 |
| JP | 04025716 | A | 1/1992 |
| JP | 2574740 | | 6/1998 |
| JP | 11264742 | A | 9/1999 |
| JP | 2007120964 | A | 5/2007 |
| JP | 2013257165 | A | 12/2013 |

\* cited by examiner

MACHINE TOOL CONTROL DEVICE HAVING FUNCTION OF DIAGNOSING MALFUNCTION IN SENSOR FOR DETECTING ONE-ROTATION SIGNAL

This application is a new U.S. patent application that claims benefit of JP 2016-091909 filed on Apr. 28, 2016, the content of 2016-091909 is incorporated herein by reference.

BACKGROUND OF THE INVENTION

1. Field of the Invention

The present invention relates to a machine tool control device, and specifically relates to a machine tool control device having the function of diagnosing a malfunction in a sensor for detecting one-rotation signals.

2. Description of Related Art

When driving feed axes or main axes of machine tools, sensors are used for detecting the speeds or positions of the axes. When some malfunction occurs in the sensor, it is required to analyze the cause of the malfunction. To analyze the cause of the malfunction in the sensor, external measurement devices such as an oscilloscope and a computer tool are required in general. The devices serve to measure waveforms of signals from the sensor and estimate the cause of the malfunction from the waveforms.

As causes of malfunctions in sensors, wire connection errors, sensor installation errors, noise, and the like are conceivable. However, concretely finding out a cause using the above devices requires much time and cost.

Thus, a device is reported that counts the number of feedback pulses between pulses of a Z-phase signal (one-rotation signals) and determines as a wire connection error, when a count value is different from a specified value (for example, Japanese Utility Model Registration No. 2574740). According to this device, an anomaly in the feedback signal can be detected based on the count value of the number of the feedback pulses between the one-rotation signals. However, since all anomalous count values are determined as wire connection errors, there is a problem that whether an anomaly in the count value is caused by noise or a sensor itself cannot be determined.

SUMMARY OF THE INVENTION

The present invention aims at providing a machine tool control device that can determine an anomalous part of a sensor, when an anomaly is recognized in a count value of the number of feedback pulses between one-rotation signals.

A machine tool control device according to an embodiment of the present invention drives a feed axis or a main axis by a motor. The machine tool control device includes a feedback counter for obtaining A- and B-phase signals of rectangular waves or sine waves and a one-rotation signal generated whenever the motor or the main axis rotates one turn, which are outputted from a sensor for detecting the position or speed of the driven axis or the motor, to calculate a feedback count value that is a count value of the number of feedback pulses generated from the A- and B-phase signals; a feedback count value storage unit for storing an inter-one-rotation-signal feedback count value that is the feedback count value counted between the two sequential one-rotation signals; a reference value storage unit for storing an anomaly determination reference value for determining the presence or absence of an anomaly in accordance with the inter-one-rotation-signal feedback count value; and an anomaly cause determination unit for determining the cause of the anomaly by comparison between the inter-one-rotation-signal feedback count value and the anomaly determination reference value.

BRIEF DESCRIPTION OF THE DRAWINGS

The objects, features, and advantages of the present invention will become more apparent from the following detailed description of a preferred embodiment, along with accompanying drawings. In the accompanying drawings.

DETAILED DESCRIPTION OF THE INVENTION

Figure 1:
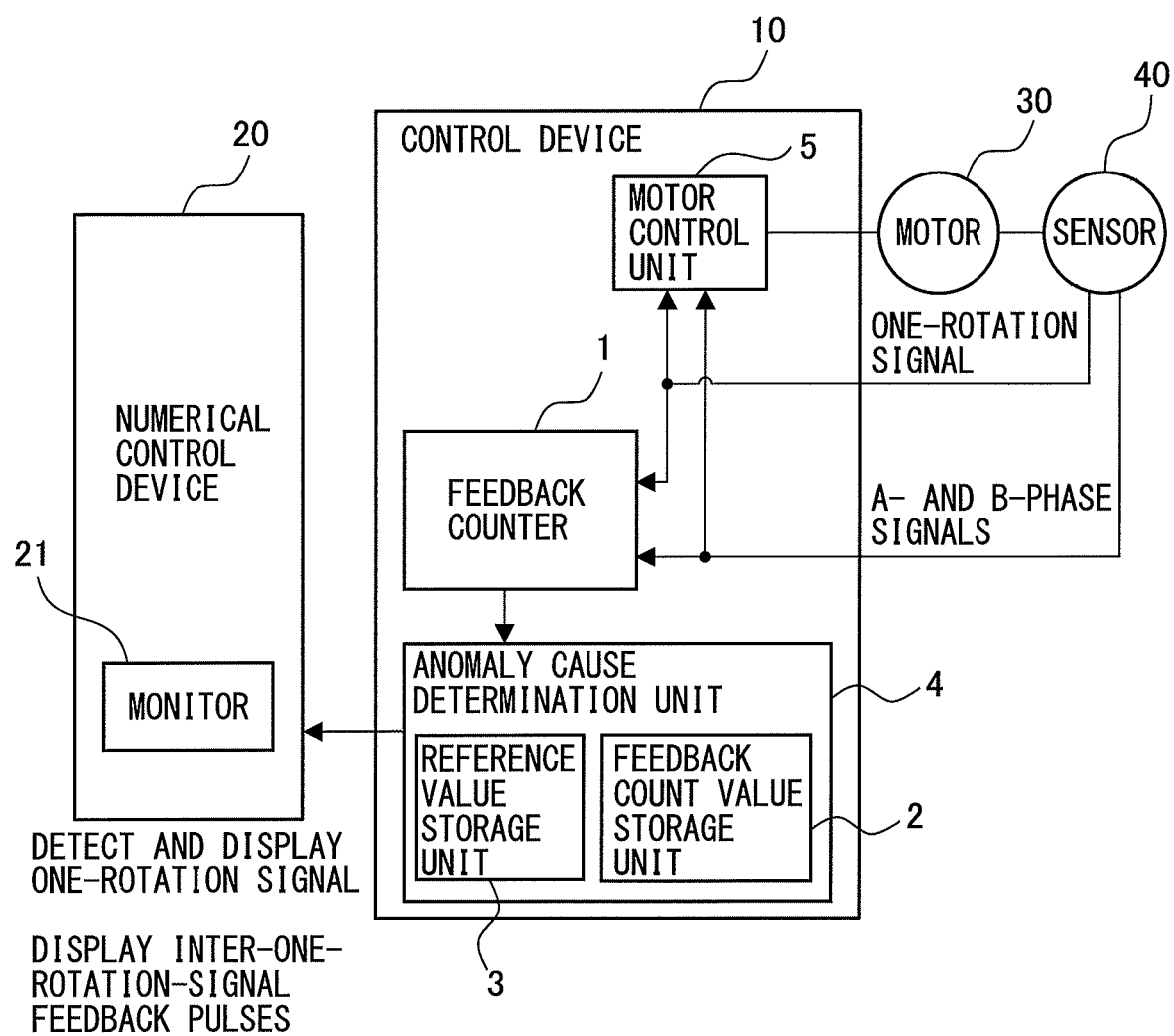
FIG. 1 is a block diagram of a machine tool control device according to the embodiment of the present invention.

A machine tool control device according to the present invention will be described below with reference to the drawings. FIG. 1 is a block diagram of the machine tool control device according to an embodiment of the present invention. A machine tool control device (hereinafter also simply called "control device") 10, for driving a feed axis or a main axis by a motor 30, includes a feedback counter 1, a feedback count value storage unit 2, a reference value storage unit 3, an anomaly cause determination unit 4, and a motor control unit 5.

A sensor 40 is provided in the vicinity of the motor 30. The sensor 40 detects the position or speed of a driven axis (not shown) or the motor 30. As the sensor 40, for example, an encoder is usable. The sensor 40 outputs A- and B-phase signals and one-rotation signals. The A- and B-phase signals are two pulse signals having a phase difference of 90°. The B-phase signal has a phase difference of +90° or −90° with respect to the outputted A-phase signal, depending on the rotation direction of the motor. Depending on the rotation amount of the motor, the number of pulses (feedback pulses) of each of the outputted A- and B-phase signals is increased or decreased. Depending on the rotation speed of the motor, the interval of pulses of each of the outputted A- and B-phase signals is widened or narrowed. The one-rotational signal is a pulse signal that is generated whenever the motor or the main axis rotates one turn.

The motor control unit 5 controls the motor 30 using the one-rotation signals and the A- and B-phase signals from the sensor 40 as feedback signals.

The feedback counter 1 obtains the A- and B-phase signals and the one-rotation signals outputted from the sensor 40, to calculate an inter-one-rotation-signal feedback count value. The inter-one-rotation-signal feedback count value is a count value of the number of feedback pulses generated from the A- and B-phase signals between the two sequential one-rotation signals. The feedback counter 1 outputs the calculated inter-one-rotation-signal feedback count value to the anomaly cause determination unit 4.

The anomaly cause determination unit 4 has the feedback count value storage unit 2 and the reference value storage unit 3. However, the feedback count value storage unit 2 and the reference value storage unit 3 may be provided outside the anomaly cause determination unit 4.

The feedback count value storage unit 2 stores the inter-one-rotation-signal feedback count value.

The reference value storage unit 3 stores an anomaly determination reference value to determine the presence or absence of an anomaly in accordance with the inter-one-rotation-signal feedback count value. For example, the anomaly determination reference value may be set at a standard count value (Ct1), which is an inter-one-rotation-signal feedback count value that is assumed to be obtained when the sensor 40 operates normally. The anomaly determination reference value may be set at an allowable error. However, these are just examples and the present invention is not limited thereto.

The anomaly cause determination unit 4 determines the cause of an anomaly by comparison between the inter-one-rotation-signal feedback count value and the anomaly determination reference value. A method for determining the cause of an anomaly will be described later in detail. The anomaly cause determination unit 4 outputs a determination result of the cause of the anomaly to a numerical control device 20.

The numerical control device 20 includes a monitor 21. Upon receiving a signal (notification) that the inter-one-rotation-signal feedback count value outputted from the anomaly cause determination unit 4 is different from the anomaly determination reference value, the numerical control device 20 displays a message for inducing checking the occurrence of an anomaly on the monitor 21. The monitor 21 can also display a message that the one-rotation signals are detected, or display the feedback pulses between the one-rotation signals.

Figure 2:
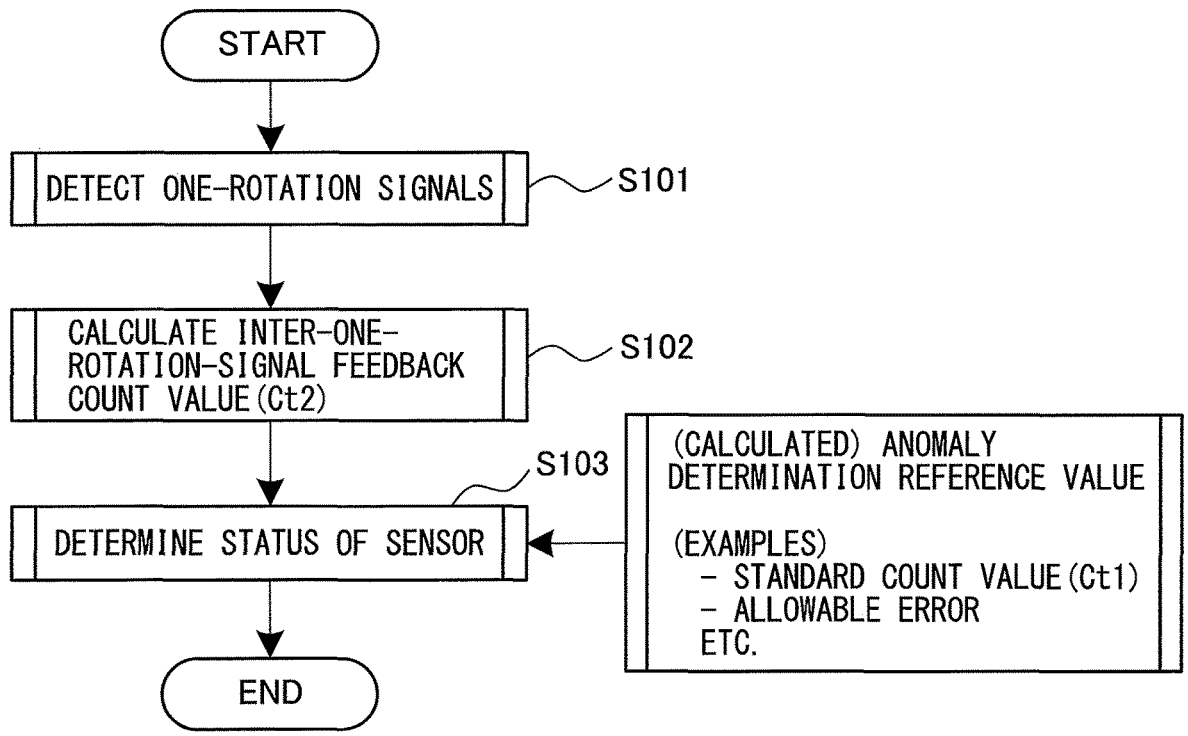
FIG. 2 is a flowchart of the schematic operation process of the machine tool control device according to the embodiment of the present invention.

Next, the schematic operation process of the machine tool control device according to the embodiment of the present invention will be described with reference to a flowchart of FIG. 2. In step S101, the sensor 40 detects one-rotation signals. The sensor 40 also detects A- and B-phase signals, and outputs the detected one-rotation signals and A- and B-phase signals to the feedback counter 1.

Next, in step S102, the feedback counter 1 calculates an inter-one-rotation-signal feedback count value (Ct2). The feedback counter 1 outputs the calculated inter-one-rotation-signal feedback count value to the anomaly cause determination unit 4. The anomaly cause determination unit 4 stores the obtained inter-one-rotation-signal feedback count value in the feedback count value storage unit 2.

Next, in step S103, the anomaly cause determination unit 4 determines the status of the sensor. In other words, the anomaly cause determination unit 4 determines the status of the sensor by comparison between the inter-one-rotation-signal feedback count value stored in the feedback count value storage unit 2 and the anomaly determination reference value stored in the reference value storage unit 3.

As described above, the machine tool control device according to the embodiment of the present invention can detect the presence or absence of an anomaly in the sensor based on the one-rotation signals and the A- and B-phase signals outputted from the sensor.

Next, a method for determining the cause of an anomaly in the sensor will be described. The machine tool control device 10 determines an anomalous part of the sensor in each of a case where there is an anomaly in one-rotation signals and a case where there is an anomaly in A- and B-phase signals, in consideration of how to vary feedback pulses between the one-rotation signals.

Figure 3:
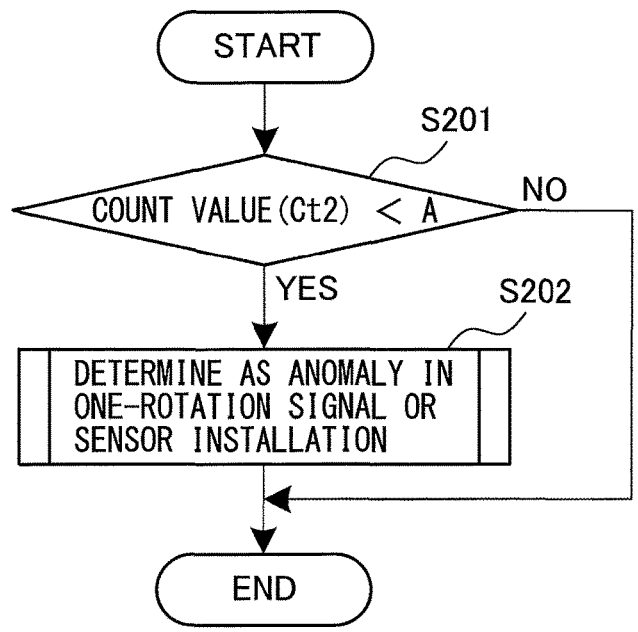
FIG. 3 is a flowchart of an anomaly determination process, when an inter-one-rotation-signal feedback count value is lower than an anomaly determination reference value, in the machine tool control device according to the embodiment of the present invention.

An anomaly determination process of the machine tool control device according to the embodiment of the present invention, when an inter-one-rotation-signal feedback count value is lower than an anomaly determination reference value, will be first described with reference to a flowchart of FIG. 3.

First, in step S201, whether or not an inter-one-rotation-signal feedback count value (count value (Ct2)) is lower than an anomaly determination reference value A is determined. When noise causes a disturbance and anomaly in one-rotation signals, the one-rotation signals are likely to occur at a plurality of points within one turn. Thus, the inter-one-rotation-signal feedback count value (count value) is likely to be much lower than in normal cases.

When a sensor installation error hinders a normal count of feedback pulses generated from A- and B-phase signals, the inter-one-rotation-signal feedback count value is likely to be much lower in the same manner.

Therefore, when the inter-one-rotation-signal feedback count value is lower than the anomaly determination reference value A, in step S202, it is determined that there is an anomaly in the one-rotation signals or sensor installation. As described above, when the inter-one-rotation-signal feedback count value is lower than the anomaly determination reference value, it is determined that noise disturbs the one-rotation signals or there is a problem in sensor installation.

Next, an anomaly determination process of the machine tool control device according to the embodiment of the present invention, when an inter-one-rotation-signal feedback count value is higher than the anomaly determination reference value, will be described.

When noise disturbs A- and B-phase signals, an anomaly occurs in a circuit to detect phase variations by comparison between the A- and B-phase signals. Thus, a count value of feedback pulses has an error D, relative to a value of normal cases, in a period of one pulse width of each signal when the A- and B-phase signals are rectangular waves, and in a period of one wavelength of each signal when the A- and B-phase signals are sine waves. However, the error occurring due to one anomaly is relatively small. Thus, the inter-one-rotation-signal feedback count value does not become much lower than in normal cases. Therefore, when the inter-one-rotation-signal feedback count value is higher than the anomaly determination reference value, and an error relative to a value of normal cases is an integer multiple of the error D, the A- and B-phase signals are determined to be disturbed by noise. In other words, the anomaly cause determination unit 4 determines that noise disturbs the A- and B-phase signals, when the inter-one-rotation-signal feedback count value is higher than the anomaly determination reference value, and the error between the inter-one-rotation-signal feedback count value and an inter-one-rotation-signal feedback count value when the sensor operates normally corresponds to an integer multiple of the error that is calculated from the number of pulses or waves of the A- and B-phase signals per rotation as an error being likely to occur whenever noise disturbs the A- and B-phase signals.

On the other hand, when the inter-one-rotation-signal feedback count value is higher than the anomaly determination reference value, and the error relative to the value of the normal cases is not an integer multiple of the error D, it is determined that an anomaly in the one-rotation signals is likely to cause variations in generation points of the one-rotation signals. In other words, the anomaly cause determination unit 4 determines that there is an anomaly in the one-rotation signals, when the error of the inter-one-rotation-signal feedback count value does not correspond to an integer multiple of the error that is likely to occur whenever noise disturbs the A- and B-phase signals.

Figure 4:
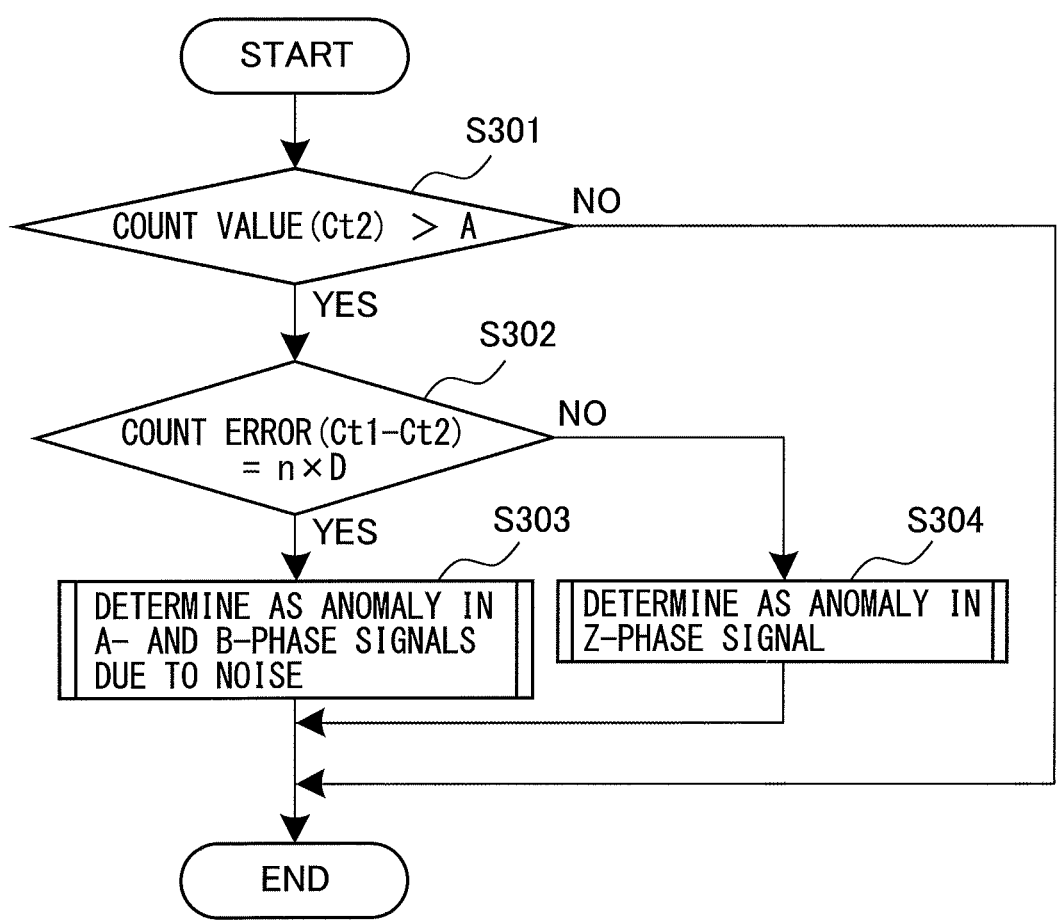
FIG. 4 is a flowchart of an anomaly determination process, when the inter-one-rotation-signal feedback count value is higher than the anomaly determination reference value, in the machine tool control device according to the embodiment of the present invention.

Next, the anomaly determination process of the machine tool control device according to the embodiment of the present invention, when an inter-one-rotation-signal feedback count value is higher than the anomaly determination reference value, will be described with reference to a flowchart of FIG. 4. First, in step S301, whether or not an inter-one-rotation-signal feedback count value (count value (Ct2)) is higher than the anomaly determination reference value A is determined. When the count value is higher than the anomaly determination reference value A, in step S302, whether or not the following equation (1), which indicates that the difference between an inter-one-rotation-signal feedback count value (Ct1) when the sensor operates normally and the calculated inter-one-rotation-signal feedback count value (Ct2) is an integer multiple of (n times) the error D, holds true is determined.

$$(Ct1-Ct2)=n \times D \qquad (1)$$

When the equation (1) holds true, in step S303, it is determined that an anomaly occurs in the A- and B-phase signals due to noise. On the other hand, when the equation (1) does not hold true, in step S304, it is determined that an anomaly occurs in the Z-phase signal (one-rotation signals).

Figure 5:
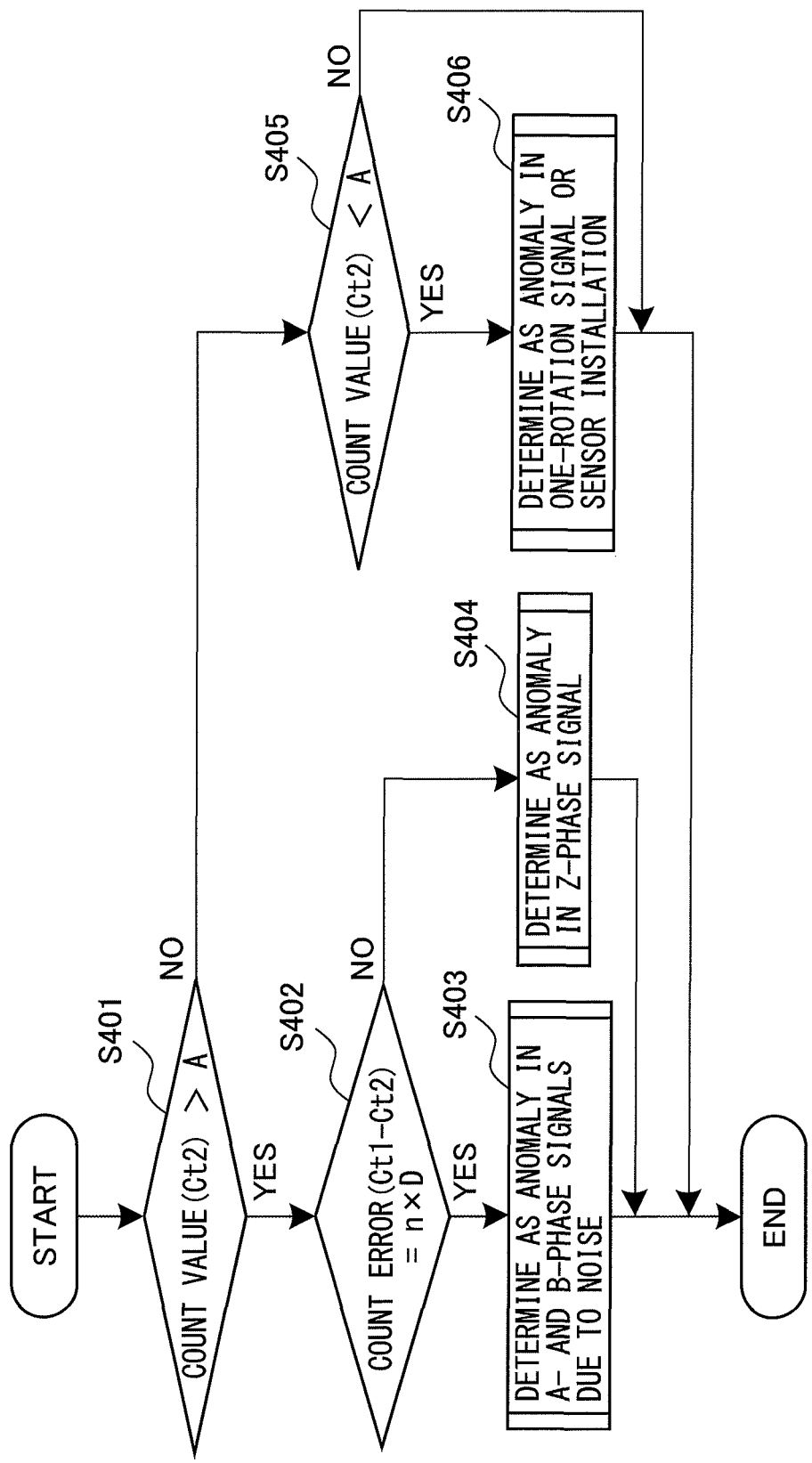
FIG. 5 is a flowchart of an anomaly determination process, when the inter-one-rotation-signal feedback count value is lower or higher than the anomaly determination reference value, in the machine tool control device according to the embodiment of the present invention.

The above describes the methods for determining an anomaly in cases where the inter-one-rotation-signal feedback count value (count value (Ct2)) is lower and higher than the anomaly determination reference value A, respectively. However, not limited thereto, both of the methods may be performed in a sequential manner. A method for determining the presence or absence of an anomaly in which after the presence or absence of an anomaly is determined on condition that an inter-one-rotation-signal feedback count value (count value (Ct2)) is higher than the anomaly determination reference value A, the presence or absence of an anomaly is determined on condition that the inter-one-rotation-signal feedback count value (count value (Ct2)) is lower than the anomaly determination reference value A, will be described with reference to a flowchart of FIG. 5.

First, in step S401, whether or not an inter-one-rotation-signal feedback count value (count value (Ct2)) is higher than an anomaly determination reference value A is determined. When the count value is higher than the anomaly determination reference value A, in step S402, whether or not the above equation (1), which indicates that the difference between an inter-one-rotation-signal feedback count value (Ct1) when the sensor operates normally and the calculated inter-one-rotation-signal feedback count value (Ct2) is an integer multiple of (n times) the error D, holds true is determined.

When the equation (1) holds true, in step S403, it is determined that an anomaly occurs in the A- and B-phase signals due to noise. On the other hand, when the equation (1) does not hold true, in step S404, it is determined that an anomaly occurs in the Z-phase signal (one-rotation signals).

On the other hand, when the count value is lower than the anomaly determination reference value A, in step S405, whether or not the inter-one-rotation-signal feedback count value (count value (Ct2)) is lower than the anomaly determination reference value A is determined. When the inter-one-rotation-signal feedback count value is lower than the anomaly determination reference value A, in step S406, it is determined that an anomaly occurs in the one-rotation signals or sensor installation.

On the contrary, when the inter-one-rotation-signal feedback count value (count value (Ct2)) is equal to the anomaly determination reference value A, the sensor is determined to have no anomaly.

The above describes the method in which after the presence or absence of an anomaly is determined on condition that the inter-one-rotation-signal feedback count value is higher than the anomaly determination reference value, the presence or absence of an anomaly is determined on condition that the inter-one-rotation-signal feedback count value is lower than the anomaly determination reference value, but the present invention is not limited thereto. In other words, after the presence or absence of an anomaly may be determined on condition that an inter-one-rotation-signal feedback count value is lower than the anomaly determination reference value, the presence or absence of an anomaly may be determined on condition that the inter-one-rotation-signal feedback count value is higher than the anomaly determination reference value.

As described above, the machine tool control device according to the embodiment of the present invention can monitor the status of of the sensor without using any external measurement devices, and determine an anomalous part of the sensor.

According to the machine tool control device of the embodiment of the present invention, when an anomaly is recognized in a count value of the number of feedback pulses between one-rotation signals, it is possible to determine an anomalous part in the sensor.

What is claimed is:

1. A machine tool control device for driving a feed axis or a main axis by a motor, comprising:
   a feedback counter for obtaining A-phase and B-phase signals of rectangular waves or sine waves and a one-rotation signal generated whenever the motor or the main axis rotates one turn, the A-phase and B-phase signals and the one-rotation signal being outputted from a sensor for detecting the position or speed of the driven axis or the motor, to calculate a feedback count value that is a count value of the number of feedback pulses generated from the A-phase and B-phase signals;
   a feedback count value storage unit for storing an inter-one-rotation-signal feedback count value that is the feedback count value counted between the two sequential one-rotation signals;
   a reference value storage unit for storing an anomaly determination reference value for determining the presence or absence of an anomaly in accordance with the inter-one-rotation-signal feedback count value; and
   an anomaly cause determination unit for determining the cause of the anomaly by comparison between the inter-one-rotation-signal feedback count value and the anomaly determination reference value, wherein
      when the inter-one-rotation-signal feedback count value is higher than the anomaly determination reference value, and when a first error corresponds to an integer multiple of a second error, the anomaly cause determination unit determines that noise disturbs the A-phase and B-phase signals, and when the inter-one-rotation-signal feedback count value is higher than the anomaly determination reference value, and the first error does not correspond to an integer multiple of the second error, the anomaly cause determination unit determines that there is an anomaly in the one-rotation signal, wherein the first error is an error between the inter-one-rotation-signal feedback count value and a standard count value which is an inter-one-rotation-signal feedback count value when the sensor operates normally, and wherein the second error is an error that is calculated from the number of pulses or waves of the A-phase and B-phase signals per rotation as an error being likely to occur whenever noise disturbs the A-phase and B-phase signals.

2. The machine tool control device according to claim 1, wherein when the inter-one-rotation-signal feedback count value is lower than the anomaly determination reference value, the anomaly cause determination unit determines that there is an anomaly in the one-rotation signal due to noise or an anomaly in sensor installation.

3. The machine tool control device according to claim 1, wherein when the inter-one-rotation-signal feedback count value is different from the anomaly determination reference value, a signal is outputted to display a message for inducing checking the occurrence of an anomaly.

* * * * *